United States Patent

Inoue et al.

[11] Patent Number: 5,929,834
[45] Date of Patent: Jul. 27, 1999

[54] LIQUID CRYSTAL DISPLAY DEVICE WITH TABLET

[75] Inventors: Kinya Inoue; Shinichi Higuchi; Shinji Hirano; Kouichi Ogino; Yoshihisa Endo; Mikio Matsumoto, all of Fukushima-ken, Japan

[73] Assignee: Brinks Hofer Gilson & Lione, Tokyo, Japan

[21] Appl. No.: 08/633,250

[22] Filed: Apr. 18, 1996

[30] Foreign Application Priority Data

Apr. 25, 1995 [JP] Japan .................................. 7-101239

[51] Int. Cl.⁶ ...................................................... G09G 3/36
[52] U.S. Cl. ....................... 345/104; 345/173; 178/18.06; 178/18.1
[58] Field of Search .............................. 345/87, 104, 173; 349/56, 57, 58, 67, 76; 178/18.06, 18.01, 18.1

[56] References Cited

U.S. PATENT DOCUMENTS 4,723,836  2/1988  Kono et al. .............................. 345/104
4,789,858 12/1988  Fergason et al. ........................ 345/104
5,430,462  7/1995  Katagiri et al. ......................... 345/104
5,623,280  4/1997  Akins et al. ............................. 345/104
5,852,487 12/1998  Fujimori et al. ........................ 345/173

FOREIGN PATENT DOCUMENTS 5-19233  1/1993  Japan .

Primary Examiner—Richard A. Hjerpe
Assistant Examiner—Kent Chang
Attorney, Agent, or Firm—Brinks Hofer Gilson & Lione

[57] ABSTRACT

A liquid crystal display device with a tablet reduced in apparatus thickness and enhanced in display visibility. The liquid crystal display device mainly composed of a liquid crystal display upper glass plate, a liquid crystal, and a liquid crystal display lower glass plate is connected with a tablet on the upper glass plate, the tablet being mainly composed of a film having a first transparent electrode. A second transparent electrode arranged on the upper glass plate is made function as both an electrostatic capacity detecting electrode and a display electrode. Namely, display is made by the second transparent electrode and a third transparent electrode and a coordinate on the tablet is detected by the first transparent electrode and the second transparent electrode.

4 Claims, 5 Drawing Sheets

LIQUID CRYSTAL DISPLAY DEVICE WITH TABLET

BACKGROUND OF THE INVENTION

1. Field of the Invention

The present invention relates to a liquid crystal display (LCD) device with a tablet for entering information by touching the finger for example on the surface of the LCD device, namely by detecting a coordinate position, the LCD device being for displaying images, characters, symbols, numbers and other information.

2. Description of the Related Art

Conventionally, the liquid crystal display (LCD) device attached with an input mechanism called a tablet on the front of the display screen is in a wide use on banking online systems and dedicated Japanese wordprocessors for example. This input mechanism has been implemented in several manners including the resistance type in which a resistance change caused by touching of the finger for example on the tablet is sensed as a switching operation, the electrostatic capacity type in which change of the electrostatic capacity between electrodes by the finger touching is sensed as a switching operation, the optical type in which light is blocked by the finger for example to cause a switching operation, and the magnetostriction type in which a magnetic change caused by the finger for example is sensed as a switching operation.

The tablet of the electrostatic capacity type is constituted by a pair of transparent base plates formed with electrodes for electrostatic capacity detection, the pair of transparent base plates being integrally laminated with a transparent insulation film in between. The tablet thus constituted is adherently attached on the front surface of the LCD. However, such a setup reduces the transmittance of liquid crystal display due to the tablet insulation film and the ITO electrodes providing detection electrodes. Besides, because the tablet is adherently attached on the display screen, an offset may occur between them. Consequently, a position on the tablet which the finger touches and a corresponding position on the display screen are shifted, reducing the visibility of the display on the LCD.

To overcome those problems, a technique was disclosed in Japanese Patent Laid-Open No. Hei 5-19233 (1993), in which the upper glass plate on the LCD also serves as the base plate of the tablet, reducing the number of components necessary for constituting the tablet and, at the same time, reducing the thickness of the tablet.

In the above-mentioned disclosed LCD device with a tablet, the device may be made thinner to some extent; however, because the tablet and the LCD device are electrically independent of each other, a driver circuit dedicated to the tablet is required to increase the fabrication cost.

SUMMARY OF THE INVENTION

It is therefore an object of the present invention to provide a liquid crystal display device with a tablet that is significantly thinner in size, higher in display visibility, and less costly than the prior-art counterpart.

In carrying out the invention and according to one aspect thereof, there is provided a liquid crystal display device with a tablet, comprising a transparent base plate provided with a first transparent electrode, an upper glass plate provided with a second transparent electrode and arranged directly or indirectly on the lower surface of the transparent base plate, and a lower glass plate provided with a third transparent electrode and arranged on the upper glass plate with a liquid crystal in between, wherein the first transparent electrode and the second transparent electrode are combined to form an electrode for detecting electrostatic capacity for detecting a finger-touched position, and the second transparent electrode and the third transparent electrode are combined to form a display electrode.

In the above-mentioned novel constitution, the detecting operation by the electrostatic capacity detecting electrode is displayed during a dummy display time allocated after the display period of the liquid crystal.

Further, in the above-mentioned novel constitution, the second transparent electrode is a segment electrode of the display electrode and the third transparent electrode is a common electrode of the display electrode, voltage application to the segment electrode and the common electrode is controlled by a liquid crystal display (LCD) controller, and a detection controlling circuit is provided between the segment electrode and the LCD controller to switch the segment electrode to the display electrode or the detecting electrode according to the count of the number of basic pulses in the detection controlling circuit.

Still further, in the above-mentioned novel constitution, each electrode of the first transparent electrode is turned on/off according to the number of count pulses in the detection controlling circuit.

According to the above-mentioned novel constitution, the second transparent electrode arranged on the upper glass plate, a member arranged on top of the basic constitution of the LCD device, can be shared by both the electrostatic capacity detecting electrode of the tablet and the display electrode of the LCD device. Consequently, one electrode layer can be omitted from the constitution, reducing the thickness of the apparatus, enhancing the visibility (namely transmittance) of display, reducing the number of fabrication processes and components, and reducing the fabrication cost.

Further, the shared use of the electrode prevents the same from being used simultaneously. So, by detecting the tablet portion after performing display processing, the coordinates of the input section can be detected without affecting the display operation. Because the novel constitution controls the detecting electrodes by using the electrode controlling capability of the LCD controller, no driver circuit dedicated to the tablet is required, leading to the further reduction of the fabrication cost.

The above and other objects, features and advantages of the present invention will become more apparent from the accompanying drawings, in which like reference numerals are used to identify the same or similar parts in several views.

DESCRIPTION OF THE PREFERRED EMBODIMENT

This invention will be described in further detail by way of example with reference to the accompanying drawings.

Figure 1:
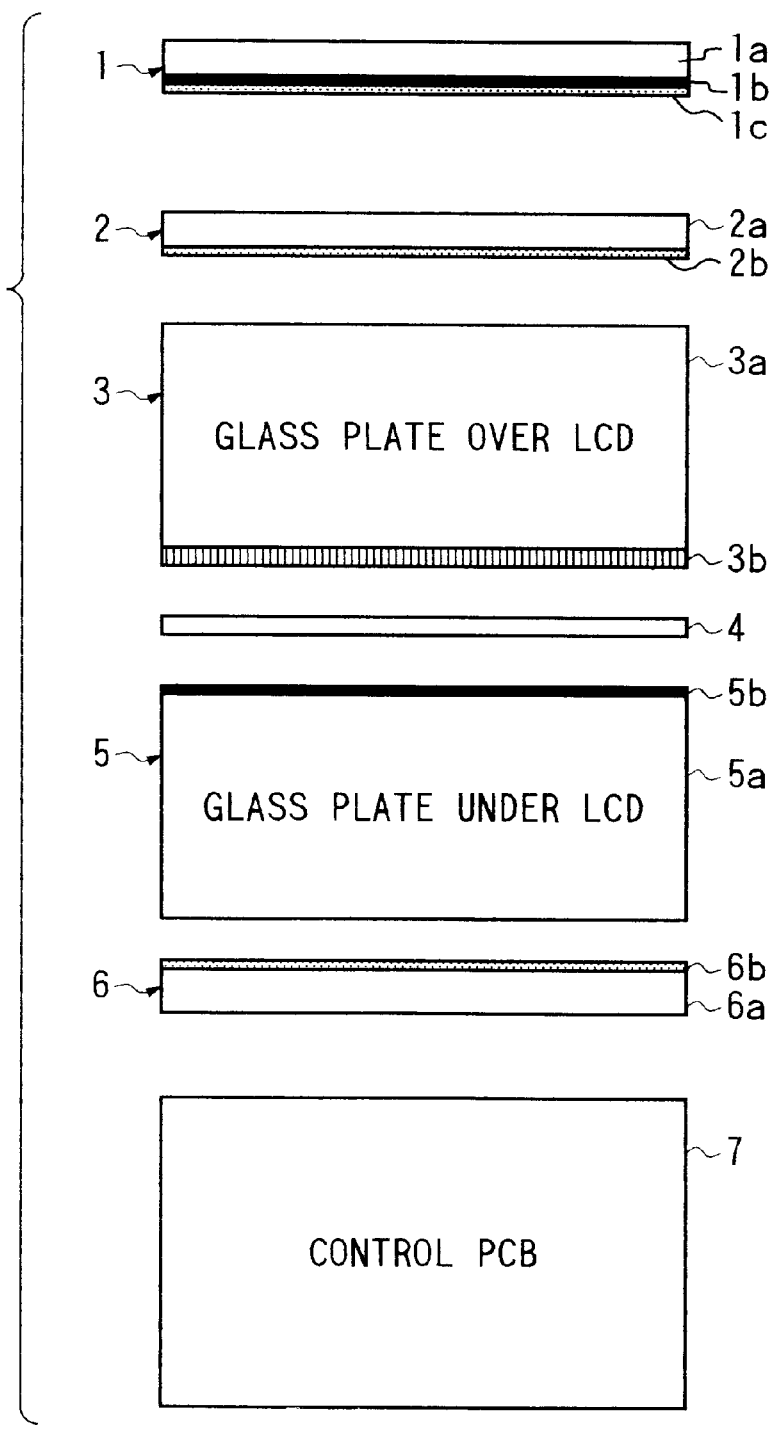
FIG. 1 is an exploded front view illustrating a liquid crystal display device with a tablet practiced as one preferred embodiment of the present invention.
Figure 2:
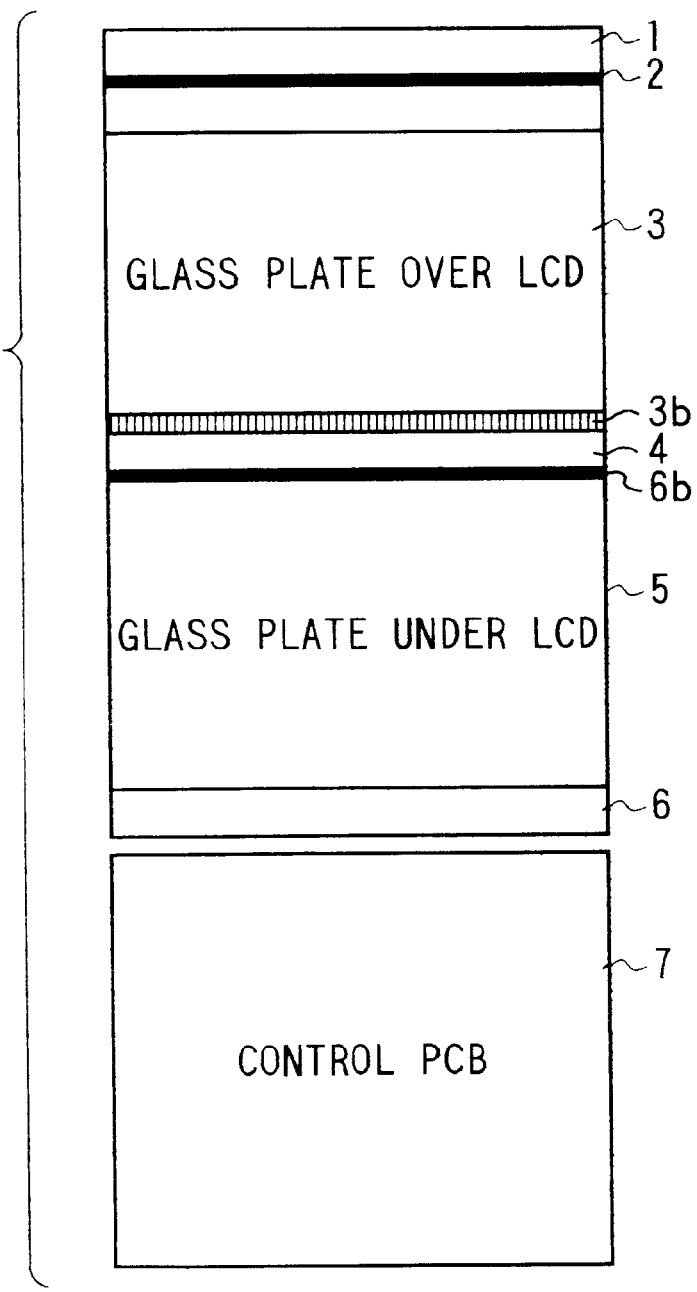
FIG. 2 is a front view illustrating the completed state of the liquid crystal display device with a tablet of FIG. 1.

FIG. 1 shows an exploded front view of a liquid crystal display (LCD) device with a tablet practiced as one preferred embodiment of the present invention. FIG. 2 is a front view of the completed state of the LCD device of FIG. 1. As shown in the figures, on the top of the constitution, a PET film 1 is arranged which is a transparent base plate also serving as a protective layer. Arranged below the PET film are a polarizing plate 2, an LCD upper glass plate 3, a liquid crystal 4, an LCD lower glass plate 5, another polarizing plate 6, and a controller printed circuit board (CPCB) 7 in this order. The screen size is selected according to the purpose of use. It will be apparent that the CPCB 7 is not necessarily integrated with the LCD device; instead, the CPCB 7 may be arranged at a remote place.

The film 1 is composed of a thin film transparent base 1a, a transparent electrode 1b (the first transparent electrode) of ITO formed on one side of the base 1a, and a pressure-sensitive adhesive (or an adhesive) 1c applied to the transparent electrode 1b. For the transparent base 1a, an extremely thin glass plate, an acrylic sheet or the like may be used. The transparent electrode 1b is composed of X-axis electrode lines for detection arranged at certain intervals by etching or printing.

The polarizing plate 2 is composed of a polarizing plate film 2a attached to the transparent electrode 1b by the adhesive 1c and a pressure-sensitive adhesive 2b applied on one surface of the polarizing plate film 2a. The LCD upper glass plate 3 is composed of a glass plate 3a providing a base and a transparent electrode 3b (the second transparent electrode) formed on the underside of the glass plate 3a by etching to serve as both the Y-axis electrode for detection orthogonal to the transparent electrode 1b and one segment electrode (the electrodes on the LCD) on the display side. Of the above-mentioned members, the film 1, the polarizing plate 2, the glass plate 3a of the LCD upper glass 3 and the transparent electrode 3b thereof constitute the tablet section. The glass plate 3a and the polarizing plate 2a constitute the base which provides a dielectric. The transparent electrode 3b and the transparent electrode 1b of the film 1 form an electrode matrix for electrostatic capacity detection.

The LCD lower glass plate 5 is composed of a glass plate 5a and a transparent electrode 5b (the third transparent electrode) formed on the upper surface of the glass plate 5a (the surface facing the liquid crystal 4) by etching to be orthogonal to the segment electrode 3b. The transparent electrode 5b (a common electrode) and the transparent electrode 3b (the segment electrode) form a display electrode. The polarizing plate 6 is mainly composed of a polarizing plate film 6a on the top of which (the surface facing the glass plate 5a) a pressure-sensitive adhesive 6b is applied to attach the polarizing plate film 6a onto the glass plate 5a.

The CPCB 7 has an LCD controller composed of a control circuit for controlling the driving of the LCD device and detecting positions on the tablet and a driver circuit. The CPCB 7 is connected to the transparent electrode 1b, the transparent electrode 3b, and the transparent electrode 5b by wiring means such as a flexible wiring board, not shown.

Figure 3:
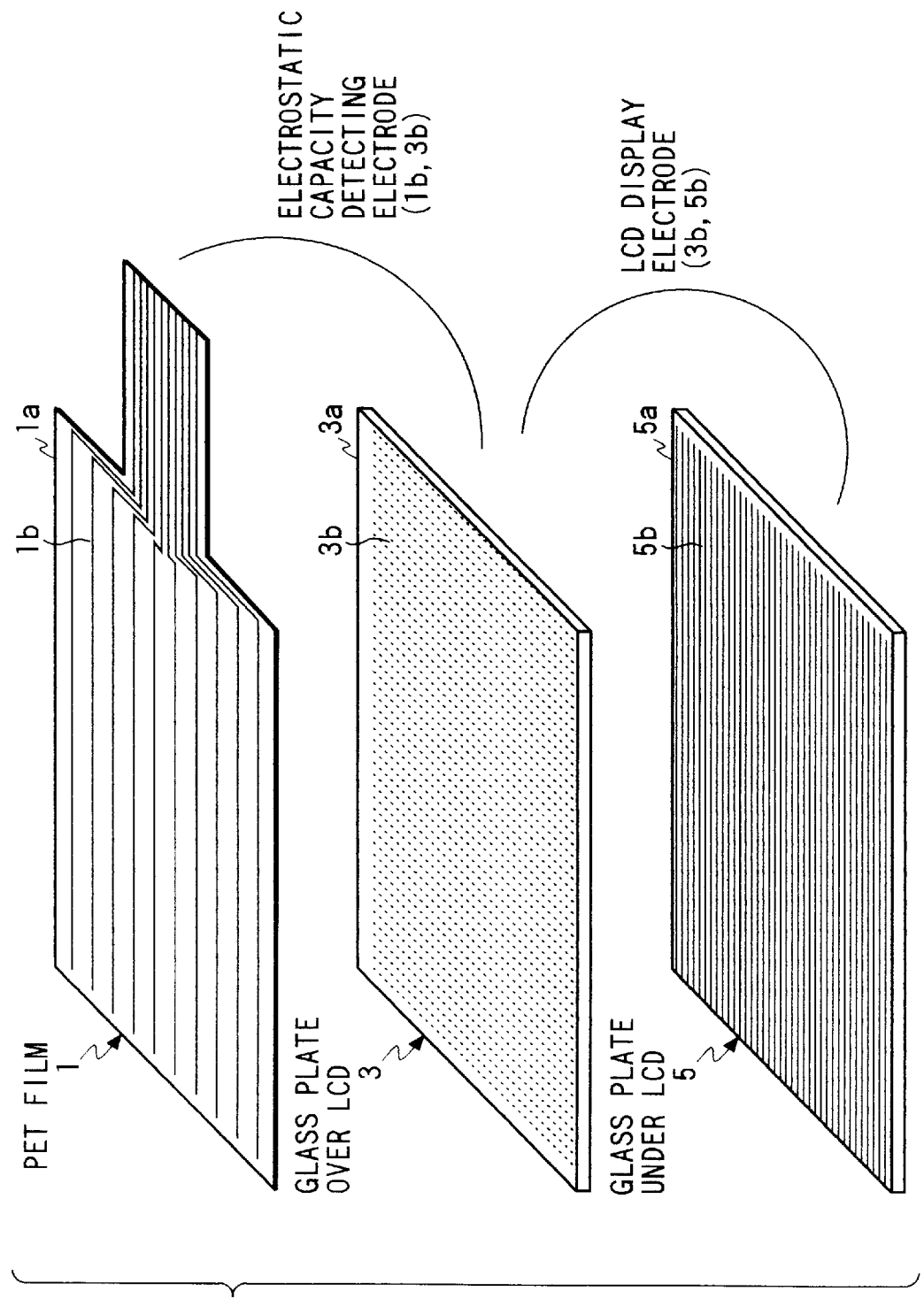
FIG. 3 is a perspective view illustrating the outline of the constitution of transparent electrodes associated with the present invention.

FIG. 3 shows a perspective view of the constitution of each of the above-mentioned transparent electrodes in an outline manner. The transparent electrode 1b is composed of 30 electrode lines arranged in parallel at intervals of 3 mm. Since the transparent electrode 1b is operated by the human finger for example, the resolution of 3 mm is considered enough for reading positions specified by finger touching. The transparent electrode 3b is composed of 320 electrode lines made of ITO material arranged at intervals of 0.36 mm, serving as the segment electrodes. The transparent electrode 5b is composed of 240 electrode lines arranged at intervals of 0.36 mm in the same direction as those of the transparent electrode 1b, serving as the common electrodes. The transparent electrodes 1b and 3b are formed in matrix. The transparent electrodes 3b and 5b are formed likewise.

Figure 4:
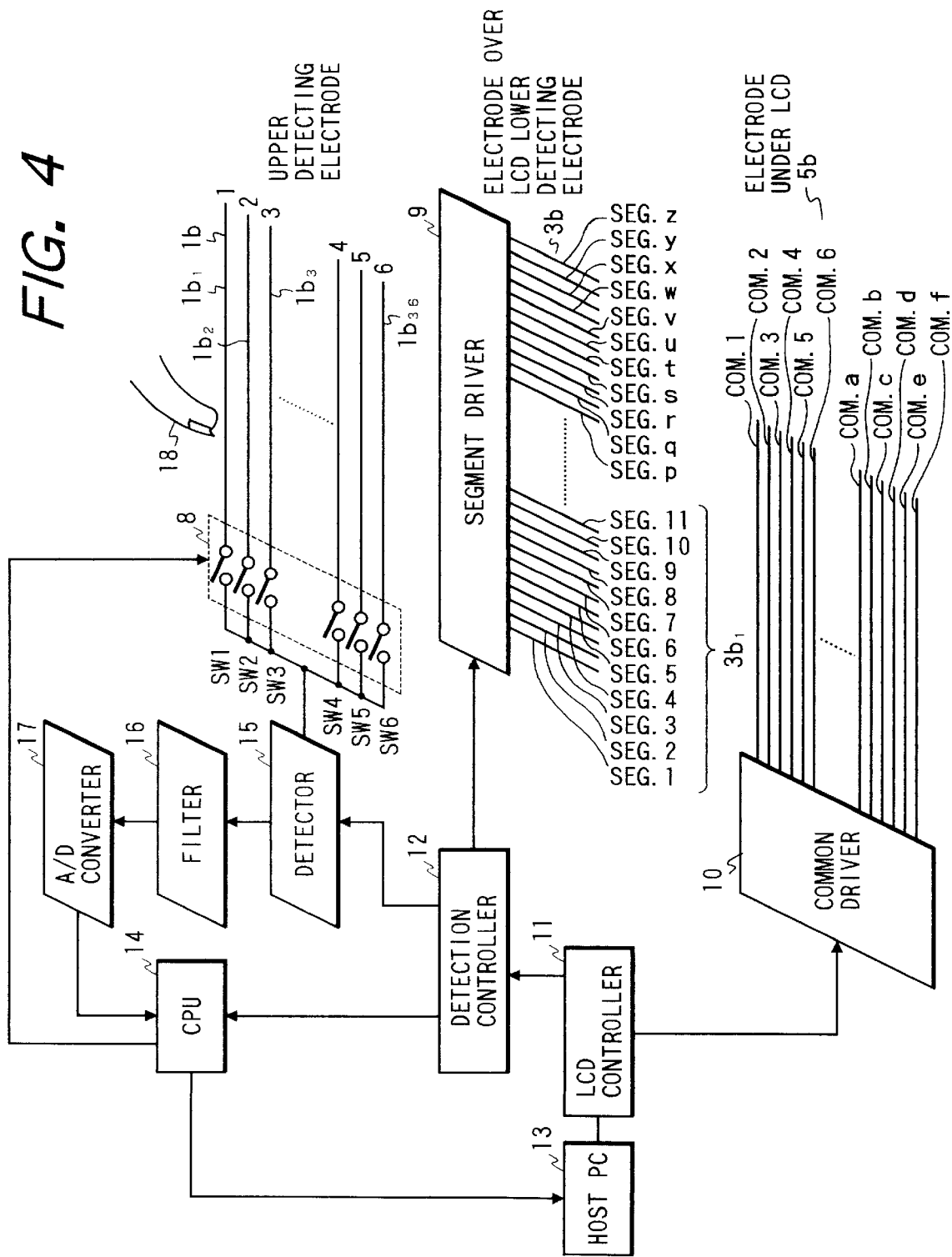
FIG. 4 is a block diagram illustrating th e constitution of the control system of the liquid crystal display device of the present invention.

FIG. 4 is a block diagram illustrating the constitution of the control system of the liquid crystal display device of the present invention. As shown, the transparent electrode 1b is connected with a multiplexer 8, the transparent electrode 3b is connected with a segment driver 9, and the transparent electrode 5b is connected with a common driver 10. The common driver 10 is controlled by an LCD controller 11 installed on the CPCB 7 and the segment driver 9 is controlled by the LCD controller 11 via a detection controller 12. The LCD controller 11, composed of a general-purpose circuit, is controlled by a host personal computer, or a host PC 13. The host PC 13 is connected with a CPU (Central Processing Unit) 14 to be supplied with a coordinate signal specified by a finger 18 and calculated by the CPU 14. It should be noted that the CPU 14 has peripheral circuits such as a ROM, a RAM, a clock generator, and an interface, not shown, to operate following a predetermined program.

The detection controller 12 and the multiplexer 8 are connected with a detector 15 to detect an operating state of the transparent electrode 1b, namely a change in the electrostatic capacity caused when the finger 18 touches the film 1. The detected voltage is sent to a filter 16 to an A/D converter 17 and to the CPU 14 as a digital signal. The filter 16 eliminates unnecessary signals (noises) from the detected voltage to prevent a detection error or the like from occurring. The A/D converter 17 converts the voltage supplied from the filter 16 into the digital signal for the CPU 14 to be able to handle the same.

Figure 5:
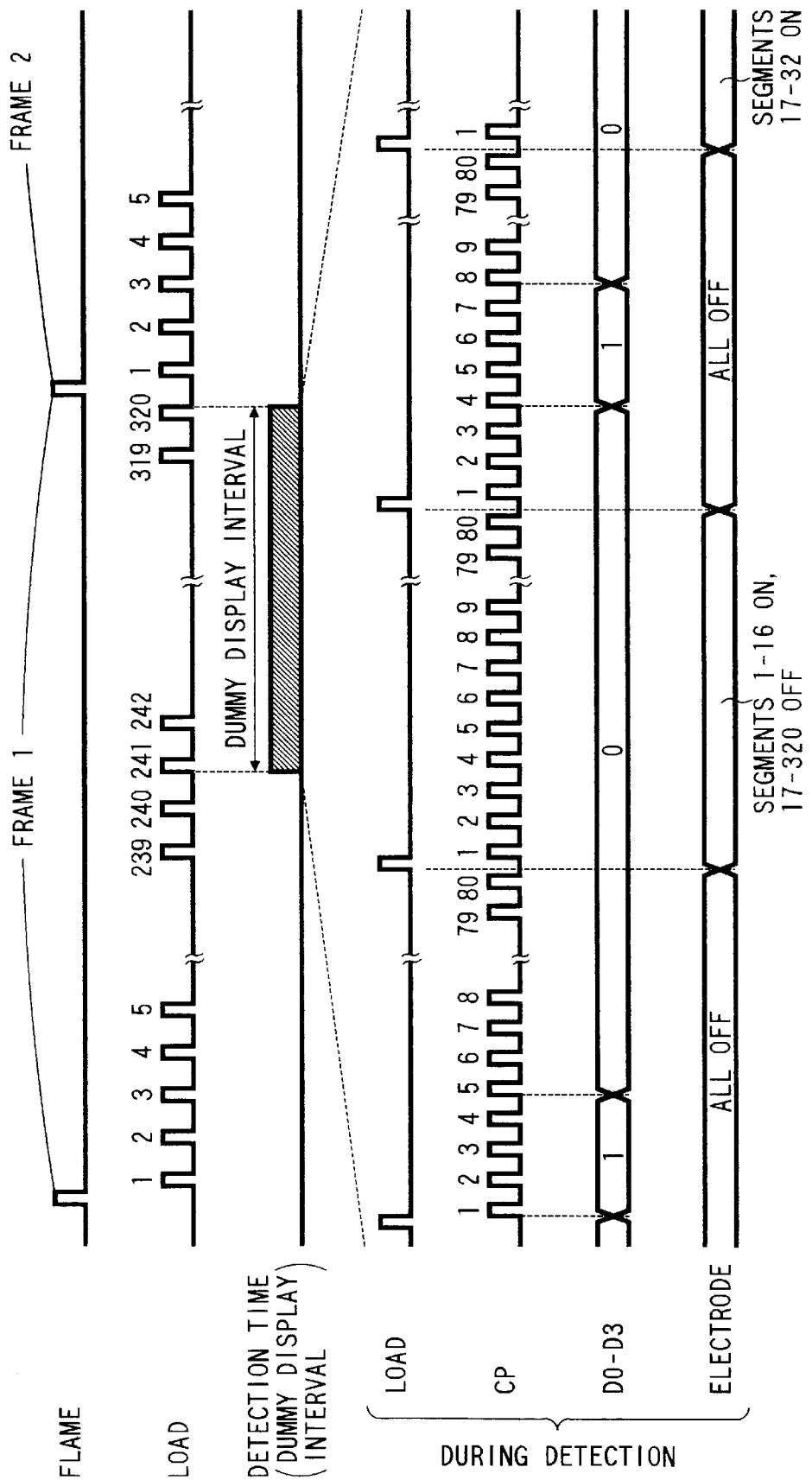
FIG. 5 is a timing chart describing the operations of the control system of FIG. 4.

Meanwhile, if the LCD device and the tablet are made completely independent of each other especially in electrode constitution, the LCD device and the tablet can be controlled and driven independently, so that timings and the like need not be considered. However, because the present invention is intended to thoroughly enhance the reduction in the thickness of overall apparatus and the transmittance of the LCD device, the transparent electrode 3b is shared by the segment electrode for display and the Y-axis electrode of the tablet for detection. Therefore, it is required to perform tablet detection without affecting a display time. To meet this requirement, the detection is performed in a dummy time for display (dummy display not associated with the display in one frame), thereby preventing the operating timings from being overlapped, details thereof being described below with reference to a flowchart of FIG. 5.

First, the LCD controller 11 generates 320 load pulse signals LP for one frame. The first through 240th load pulse signals LP control the common driver 10 under the control of the LCD controller 11 to sequentially apply a voltage to the 240 lines of the common electrode 5b, thereby performing a normal LCD operation. During a period in which the 241st through 320th load pulse signals LP are generated, no voltage is applied to the common electrode 5b to provide a dummy display period not associated with the LCD display operation by which a coordinate detection time is allocated.

On the other hand, the load pulse signals LP are also sent to the detection controller 12 to be counted. Between the first and 240th load pulse signals LP, the segment driver 9 is controlled by a control signal by the LCD controller 11 to sequentially apply a voltage to 320 lines of the segment electrode 3b, thereby turning on/off the normal LCD display in corporation with the common electrode 5b. Then, during the dummy display period (a coordinate detection time) between the 241st and 320th load pulse signals LP, the segment electrode 3b is divided into first through 20th electrode line groups $3b_1$ through $3b_{20}$ each consisting of 16 lines. Then, a voltage is applied to these groups sequentially. Namely, the segment electrode 3b is formed into Y-axis electrodes for detection $3b_1$ through $3b_{20}$ each consisting of 20 electrode lines. When the 241st load pulse signal LP is detected by the detection controller 12, a control signal is sent to the segment driver 9, which turns on $D_0$ through $D_3$ corresponding to clock pulses CP 1 through 4 and off the remaining $D_4$ through $D_{79}$ corresponding to clock pulses 5 through 80. When the 242nd load pulse signal LP is detected, the turn-on of $D_0$ through $D_3$ and the turn-off of $D_4$ through $D_{79}$ are outputted to apply a voltage to the Y-axis electrode line group $3b_1$ of the segment electrode 3b. At the same time, the controller 12 sends to the segment driver 9 a control signal that turns on $D_4$ through $D_7$ corresponding to the clock pulses 5 through 8 and turns off $D_0$ through $D_3$ and $D_8$ through $D_{79}$.

Next, when the 243rd load pulse signal LP is detected, a voltage is applied to the Y-axis electrode line group $3b_2$ of the segment electrode 3b. Thus, detection of the 244th through 320th load pulse signals LP applies a voltage to the Y-axis electrode line groups $3b_3$ through $3b_{20}$ sequentially. In the dummy display period, the Y-axis electrodes for detection composed of the first through 20th line groups $3b_1$ through $3b_{20}$ of the segment electrode 3b is applied with a voltage sequentially to detect in the detector 15 a voltage change in each of the Y-axis electrode caused by the capacitive coupling caused by touching of the finger 18 on the film 1.

Meanwhile, the 241st load pulse signal is also sent from the detection controller 12 to the CPU 14 to make the same send a control signal to the multiplexer 8 to set switches $SW_1$ through $SW_{30}$ in which the switch $SW_1$ is turned on to connect the X-axis electrode line for detection $1b_1$ with the detector 15. Then, on the 242nd through 280th load pulse signals LP, a voltage is applied to the Y-axis electrode line groups $3b_1$ through $3b_{20}$ sequentially with the $SW_1$ kept on. On the 281st through 320th load pulse signals LP, the $SW_2$ is turned on to connect an X-axis electrode line $1b_2$ with the detector 15, upon which the Y-axis electrode line groups $3b_1$ through $3b_{20}$ are scanned again to complete the first frame. Thus, in the dummy display period of the first frame, the X-axis electrode lines $1b_1$ and $1b_2$ are sequentially turned on to scan the Y-axis electrode line groups $3b_1$ through $3b_{20}$ (segment electrode line groups 1 through 20) for each X-axis electrode line. In the second frame, the above-mentioned normal LCD display operation is performed on the first through 240th load pulse signals LP. On the 241st through 280th load pulse signals LP, the $SW_3$ is turned on to connect an X-axis electrode line $1b_3$ with the detector 15, upon which the Y-axis electrode line groups $3b_1$ through $3b_{20}$ are scanned. Further, on the 281st through 320th load pulse signals LP, the $SW_4$ is turned on to connect an X-axis electrode line $1b_4$ with the detector 15, upon which the Y-axis electrode line groups $3b_1$ through $3b_{20}$ are scanned.

Thus, when the 15th frame has been reached, the $SW_{20}$ is turned on to scan the Y-axis electrode line groups $3b_1$ through $3b_{20}$, upon which the scanning of all X-axis electrode lines $1b_1$ through $1b_{20}$ is completed. Namely, the normal LCD display operation and the coordinate detecting operation are performed alternately during the frames 1 through 15; in the coordinate detecting operation, 30 X-axis electrode lines $1b_1$ through $1b_{30}$ are scanned once and the Y-axis electrode line groups $3b_1$ through $3b_{20}$ are scanned 30 times.

When the finger 18 touches the film 1, the X-axis electrode and the Y-axis electrode are capacitively coupled at the touched position with the LCD upper glass plate 3 functioning as the dielectric layer to apply the voltage from the Y-axis electrode 3b to the X-axis electrode 1b to be detected by the detector 15. The CPU 14 calculates the coordinates of the touched position on the film 1 from the detected voltage change.

It will be apparent to those skilled in the art that the liquid crystal display may be of any type, for example, back light type, transparent type, or reflection type. It will be also apparent that the polarizing plates 2 and 6 are not always necessary.

While the preferred embodiment of the present invention has been described using specific terms, such description is for illustrative purposes only, and it is to be understood that changes and variations may be made without departing from the spirit or scope of the appended claims.

What is claimed is:

1. A liquid crystal display device with a tablet comprising:
   a transparent base plate provided with a first transparent electrode;
   an upper glass plate provided with a second transparent electrode, said upper glass plate being arranged directly or indirectly on the lower surface of said transparent base plate;
   and a lower glass plate provided with a third transparent electrode, said lower glass plate being arranged on said upper glass plate with a liquid crystal therebetween;
   wherein said first transparent electrode and said second transparent electrode are combined to form an electrode for detecting electrostatic capacity for detecting a finger-touched position and said second transparent electrode and said third transparent electrode are combined to form a display electrode.

2. A liquid crystal display device with a tablet according to claim 1, wherein the detecting operation by said electrode for detecting electrostatic capacity is performed within a dummy display period allocated after a display period of the liquid crystal display.

3. A liquid crystal display device with a tablet according to claim 1, wherein said second transparent electrode functions as a segment electrode for the display electrode, said third transparent electrode functions as a common electrode for the display electrode, voltage application to said segment electrode and said common electrode is controlled by a liquid crystal display controller, a detection controlling circuit is arranged between said segment electrode and said liquid crystal display controller, and said segment electrode is switched to one of said display electrode and said electrode for detecting electrostatic capacity according to the number of basic pulses detected by said detection controlling circuit.

4. A liquid crystal display device with a tablet according to claim 1, wherein turn-on and turn-off operations of each electrode line of said first transparent electrode are controlled according to the number of basic pulses detected by said detection controlling circuit.

* * * * *

UNITED STATES PATENT AND TRADEMARK OFFICE
CERTIFICATE OF CORRECTION

PATENT NO.   : 5,929,834
DATED        : July 27, 1999
INVENTOR(S)  : Kinya Inoue et al.

It is certified that error appears in the above-identified patent and that said Letters Patent is hereby corrected as shown below:

In column 2, line 8, under "ABSTRACT", change "is made" to --may--.

Signed and Sealed this

Fifteenth Day of August, 2000

Q. TODD DICKINSON

Attest:

Attesting Officer          Director of Patents and Trademarks

UNITED STATES PATENT AND TRADEMARK OFFICE
CERTIFICATE OF CORRECTION

PATENT NO. : 5,929,834
DATED : July 27, 1999
INVENTOR(S) : Kinya Inoue et al.

It is certified that error appears in the above-identified patent and that said Letters Patent is hereby corrected as shown below:

Title page, item "[73] Assignee:" change "Brinks Hofer Gilson & Lione" to -- Alps Electric Co., Ltd. --

Signed and Sealed this

Thirty-first Day of October, 2000

Attest:

Attesting Officer

Q. TODD DICKINSON
Director of Patents and Trademarks